United States Patent [19]
Watkins

[11] Patent Number: 5,828,872
[45] Date of Patent: Oct. 27, 1998

[54] IMPLEMENTATION OF HIGH SPEED SYNCHRONOUS STATE MACHINES WITH SHORT SETUP AND HOLD TIME SIGNALS

[75] Inventor: John Watkins, Sunnyvale, Calif.

[73] Assignee: Sun Microsystems, Inc., Mountain View, Calif.

[21] Appl. No.: 673,116

[22] Filed: Jul. 1, 1996

[51] Int. Cl.⁶ ............................ H03K 19/173; G06F 7/38
[52] U.S. Cl. ................................. 395/559; 326/46
[58] Field of Search .................. 395/559, 595, 395/555; 326/46; 364/488–491

[56] References Cited

U.S. PATENT DOCUMENTS

| | | | |
|---|---|---|---|
| 4,965,472 | 10/1990 | Anderson | 326/46 |
| 5,389,838 | 2/1995 | Orengo | 326/93 |
| 5,394,557 | 2/1995 | Ellis | 395/800 |
| 5,644,497 | 7/1997 | Hyman | 364/489 |

*Primary Examiner*—Thomas M. Heckler
*Attorney, Agent, or Firm*—Blakely Sokoloff Taylor & Zafman

[57] ABSTRACT

An apparatus and method of handling short setup and hold time input signals. The apparatus separates the processing of the data signals into an input flip-flop portion, a state machine portion, a combinatorial logic mapping portion and a rapid selecting circuit. The input flip-flops capture the signals allowing processing when the hold times are very small. The state machine portion generates a new current state from the input signals. The combinatorial logic mapping circuit generates a set of possible outcomes based on the result of the state machine and moderate setup time inputs. A rapid selecting circuit quickly chooses among the possible outcomes based on received short setup and hold time signals.

22 Claims, 5 Drawing Sheets

IMPLEMENTATION OF HIGH SPEED SYNCHRONOUS STATE MACHINES WITH SHORT SETUP AND HOLD TIME SIGNALS

BACKGROUND OF THE INVENTION

1. Field of the Invention

The present invention relates to the field of computing, data processing and digital communications. In particular, the described invention discloses a process and method of processing short setup time signals.

2. Description of Related Art

Rapidly increasing information traffic as well as increased computational needs continue to push bus and processor limits as users demand faster computers and higher data transfer rates. As processing times increase, clock frequencies increase and clock periods decrease. These shorter clock cycles result in problems when logic circuit processing speeds approach that of a clock cycle.

The correct operation of a circuit depends on certain timing criteria being satisfied. FIG. 1 depicts some of the timing criteria which needs to be satisfied. One criterion is that a sufficient setup time 104 is available, and a subsequent sufficient hold time 108 is available. The setup time 104 is the amount of time preceding the change of state 112 in a control signal 116, typically a clock transition, in which a data signal 120 must be kept steady in order for a logic circuit to properly process the data. The hold time 108 is the amount of time following the change in a control signal 112, again typically a clock transition 112, in which the data signal 120 must be held steady for a logic circuit to properly process the signal.

The need for higher data transfer rates has led to ever decreasing clock periods. The short clock periods have created problems in designing appropriate controllers for 66 MHz peripherals, particularly in the implementation of 0.5 micron or larger transistor geometries to such controllers. Component Interconnect (PCI) buses. The specifications which define a PCI interface operating at 66 MHz provides approximately 3 nanoseconds of setup time for many of its input signals.

The PCI is a synchronous bus, thus the timing of data transfer is dictated by a general clock. Thus the 3 nanosecond setup time may be further reduced by clock skew between the source circuitry, the input buffer, and the PCI circuitry. This reduction in setup time requires the PCI circuitry to operate faster. Command signals in the PCI specification dictate how state machines within the PCI circuitry should respond. These command signals may pass through input buffers which may take up to two nanoseconds to switch. PCI circuit components utilizing half micron technology may take another 4 to 5 nanoseconds to appropriately process the signals. The coordination of the source circuitry and PCI circuitry, combined with the short setup and hold times has created problems implementing logic circuits in PCI interfaces operating at 66 MHz.

Although the foregoing described the difficulty in implementing high speed PCI buses, the problem created by short setup time signals is not limited to PCI buses. Other bus and data processing circuitry designs are also limited due to difficulty in meeting the short setup time and hold time requirements often associated with high speed circuitry.

Thus, a need exists for an improved method and apparatus for handling short setup and short hold time signals produced by conventional circuitry.

SUMMARY OF THE INVENTION

Based on the foregoing, it would be desirable to develop a method and apparatus for handling short setup time and hold input signals. The disclosed invention is a processing circuit which includes a circuit housing standard processing logic divided into at least four parts to handle short setup and hold time (SSHT) signals.

The first part of the processing circuit is a set of registers which latch the short setup and hold time signals. The second part is a state machine which generates a next state by processing latched or registered signals.

The third part of the processing circuit is a combination logic circuit which generates maps of possible next state outcomes. Assuming "n" short setup and hold time ("SSHT") signals, the maximum number of different next state combinations per output is "$2^n$". These possible output combinations are transmitted to a selecting circuit, often in the form of a vector.

The fourth part of the processing circuit is the selecting circuit. The selecting circuit, uses short setup time signals transmitted directly from the input and selects one of the next state combinations computed by the third combination logic circuit. The particular combination of next state values chosen is based on the SSHT signals input into the selecting circuit. The chosen combination is output at an appropriate time in the clock cycle.

The generation of a set of maps and possible next state combinations prior to or in parallel with the arrival of the SSHT signals allows Applicant's circuit design to rapidly process these SSHT signals. The SSHT signals are routed to the selecting circuit which can quickly select a set of lines based on a set of inputs thereby handling SSHT signals. A multiplexer is typically used for the selecting circuit. The short setup time requirements of a typical multiplexer allows the processing circuit to select the proper combination, even if the input signals on the select lines of the selecting circuit have very short setup times.

BRIEF DESCRIPTION OF THE DRAWINGS

The advantages of the present invention will become more readily apparent to those ordinarily skilled in the art after reviewing the following detailed description and accompanying drawings, wherein.

DETAILED DESCRIPTION OF THE INVENTION

Figure 1:
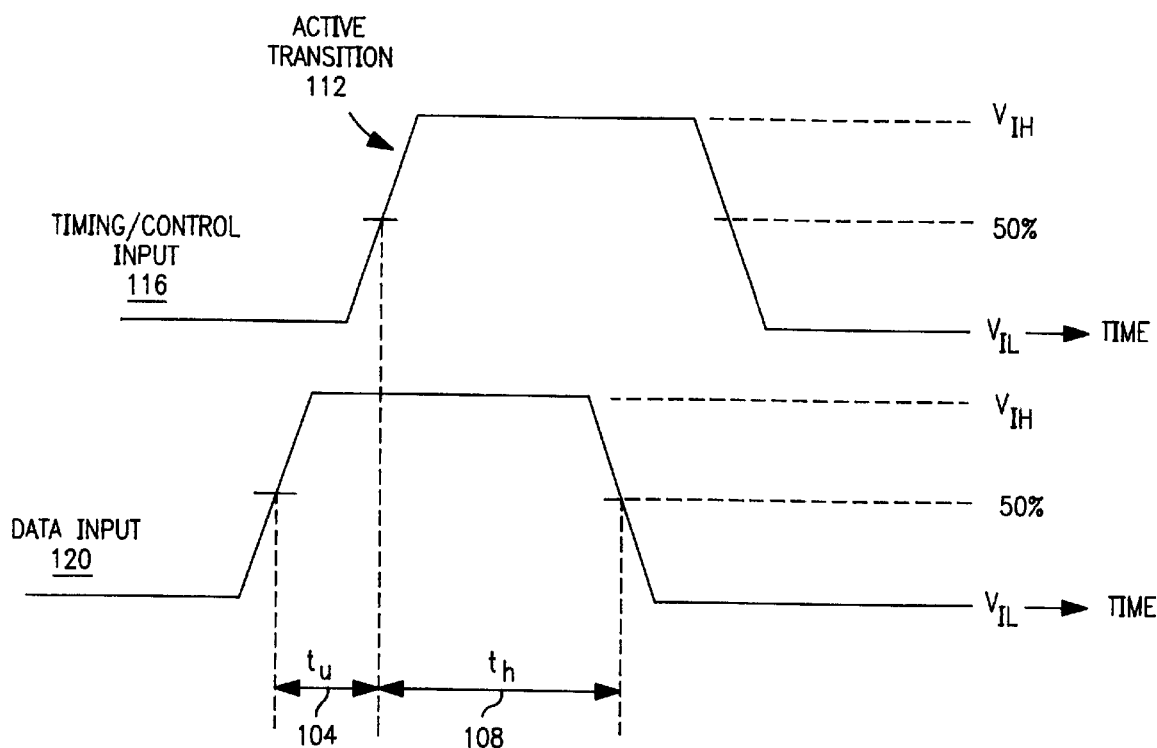
FIG. 1 is a diagram of critical timing relationships between a clock and an input signal.

FIG. 1 shows the critical timing needs of a logic circuit. A control or clock circuit generates a timing or control input signal 112 which controls operation of the logic circuit. An input signal 120, being operated on is also shown. The input signal 120 may be generated by either a source circuit or by a feed-back path of the logic circuit.

Each input signal 120, has a setup time 104 and a hold time 108. The setup time 104 is the time interval preceding a controlling instant (such as a rising edge of the clock, or an active transition as shown in FIG. 1) in which the data input signal 120 is stable. The hold time 108 is the time interval following the controlling instant in which the data input signal 120 is stable.

Input signals are classified, for purposes of this invention, into "moderate setup time input signals" ("MST") and "short setup and hold time ("SSHT") input signals". The hold times can be as small as the negative of the propagation delay of the circuitry in front of an input signal register plus the hold time of the register. "SSHT input signals" are signals with setup times shorter than a predetermined amount. The exact amount depends on the speed of the processing circuitry, generally smaller than the propagation delay of the combinatorial logic generating the next state function of a conventionally implemented state machine. MST input signals have setup times significantly larger than 3 nanoseconds.

Figure 2:
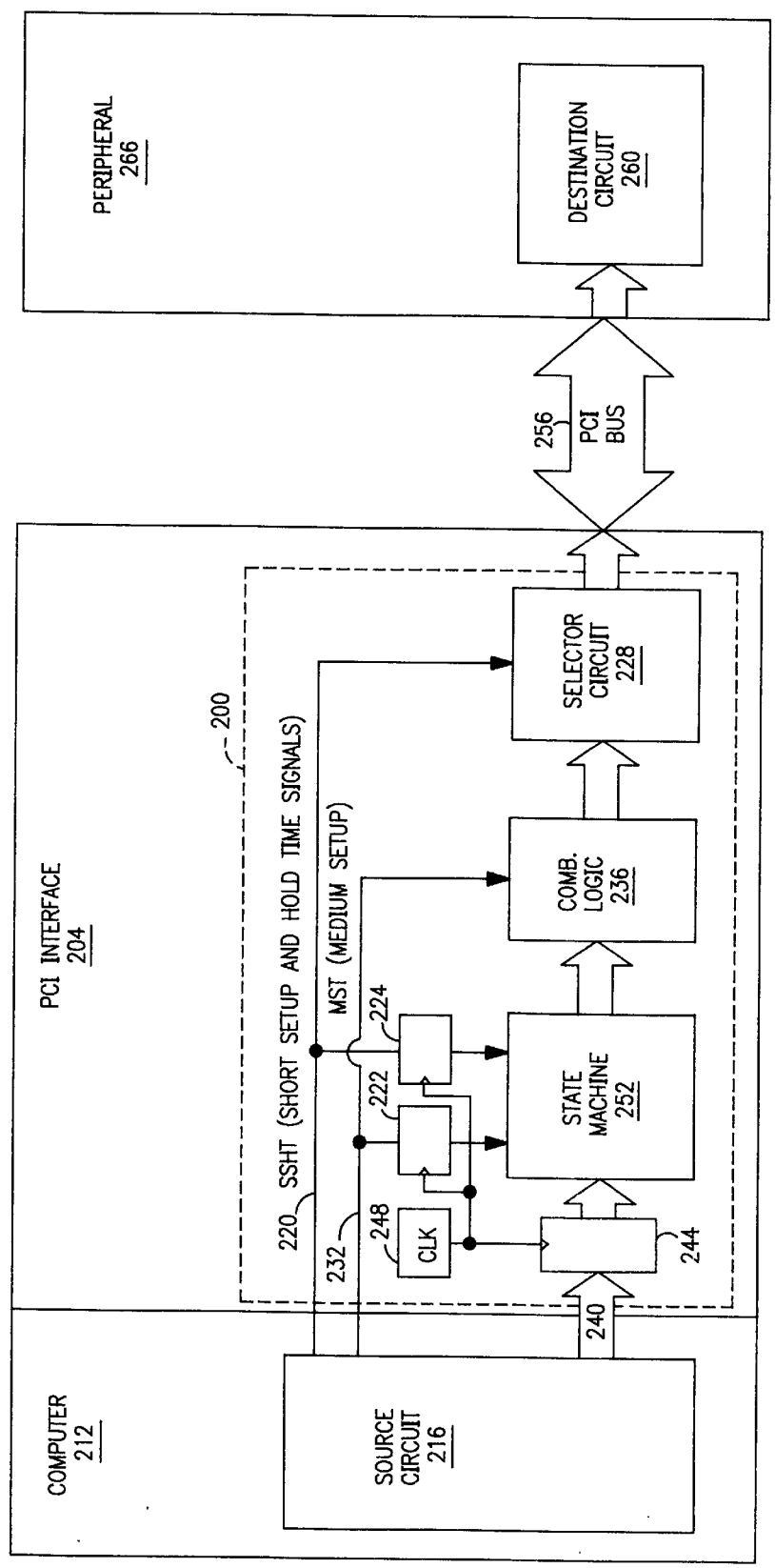
FIG. 2 shows a processing circuit used in a PCI environment.

FIG. 2 shows the processing circuit 200 used in a PCI interface 204. The PCI Interface 204 is coupled to a computer 212. The processing circuit 200 in the PCI interface 204 receives signals from a source circuit 216 inside the computer 212.

SSHT signals from the source circuit 216 propagate along line 220 and enter the flip-flop 224 and selector circuit 228. MST signals propagate along line 232 and enter flip-flop 222 and combinatorial logic 236. Other input signals propagate along line 240 and enter flip-flop 244.

The flip-flops 222, 224, 244 are clocked by a clock 248. At a transition of clock 248, the flip-flops 244, 222, 224 supply the latched signals to a state machine 252.

The output of state machine 252 is transferred to combinatorial logic 236. Combinatorial logic 236 generates possible results and outputs those results to selector circuit 228. Selector circuit 228 selects the appropriate results based on the SSHT signals from line 220. The selected results are transmitted on a PCI bus 256 to a destination circuit 260 which is part of a peripheral device 266.

Figure 3:
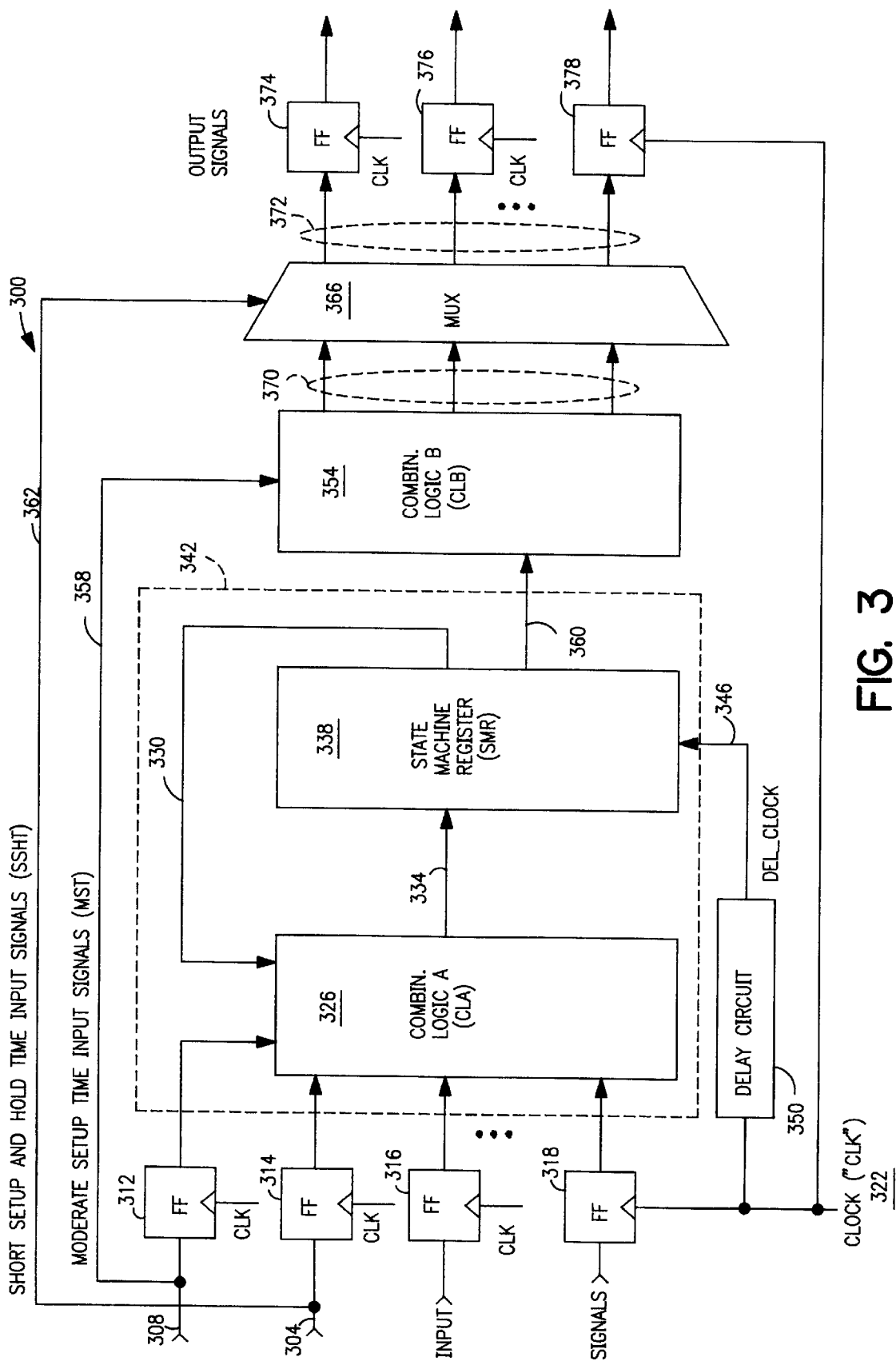
FIG. 3 is a block diagram of an embodiment of the processing circuit.

FIG. 3 shows a preferred embodiment of the processing circuit 300. Input signals from a source circuit are divided into SSHT input signals 304 and MST input signals 308. These input signals 304 and 308 are input into a set of flip-flops 312, 314, 316, 318 (or latches or registers) which store the signal, until a clock, 322 signals the flip-flops 312, 314, 316, 318 to latch new input values. The flip-flops 312, 314, 316, 318 capture the input signals prior to their removal after their hold time elapses. This is necessary to maintain the information on the input of the CLA 326 to ensure stable input signals on the state machine register input 334.

CLA 326 takes the input from the flip-flops 312, 314, 316, 318 as well as feedback information from feedback line 330 to generate a new current state output 334. The output 334 generated by CLA 326 is stored in state machine register (SMR) 338. The combination of CLA 326, SMR 338 and feedback path 330 forms the nucleus of a state machine 342. The state machine 342 output values 360, 330 are based on present inputs 304, 308 and current state 330.

The output of the state machine 342 is timed by a delayed clock (DEL_CLOCK) signal 346. The delayed clock signal 346 is generated by adding a delay circuit 350 between the clock 322 and the SMR 338 clock input. The delay generated is a fraction of a clock cycle. If the desired delay is one-half of a clock cycle, the delay circuit 350 may be replaced by an inverter.

At time "$T_{d'}$", the delayed clock signals triggers the SMR 338 to transmit the new current state output 360 to combinatorial logic B (CLB) 354.

$T_d$ is chosen such that $T_d>$ input flip-flop 314 clock to Q delay (clock to Q delay is the amount of time flip flop takes to change state)

+ propagation delay of CLA 326
+ input step time of SMR 338 and $T_d <$ clock cycle—(SMR 338 clock to Q delay
+ CLB 354 propagation delay
+ selecting circuit propagation delay
+ input setup time of the output flip-flops 374, 376, and 378)

CLB 354 uses the next state information 360 and MST signals 358 from the input to generate a set of maps. Only output signals which change state synchronously with the clock 322 signal in response to SSHT input signals 304 need to be mapped. Each mapping of data corresponds to a specific combination of SSHT input signals 362. Thus, for "n" (the number of SSHT input signals) a total of up to $2^n$ input maps may be generated.

CLB 354 uses the maps to generate an output vector. The output vector includes possible final next state outputs based on the current state output of SMR 338 and MST input signals 308. The width of the vector is less than or equal to "$2^n$" where "n" is the number of SSHT input signals 362 which can affect the synchronous output. Thus, if there are three SSHT signals which can influence a given synchronous output, an 8 bit output vector is produced by CLB 354 for that output. Each bit of the vector represents a possible final next state output value 370 for a given combination of SSHT signals 362.

CLB 354 outputs this output vector 370 into a selecting circuit 366 which may include, but is not limited to, one or more multiplexers as generally shown in FIG. 3. The source circuit also inputs SSHT input signals from line 362 into the selecting circuit 366. Selecting circuit 366 chooses the appropriate bits in the output vector 370 to generate an appropriate final next state 372 corresponding to the combination and setting of the received SSHT input signals.

The selected output signals or final next state 372 are stored in flip-flops 374, 376, or 378. The actual number of flip-flops may vary. The clock 322 which controls the timing of the logic input flip-flops 312, 314, 316, 318 also controls the output of the output flip-flops 374, 376, and 378. At the clock 322 transition, the contents of the output flip-flops 374, 376, and 378 are transmitted to a destination circuit (not shown).

Figure 4:
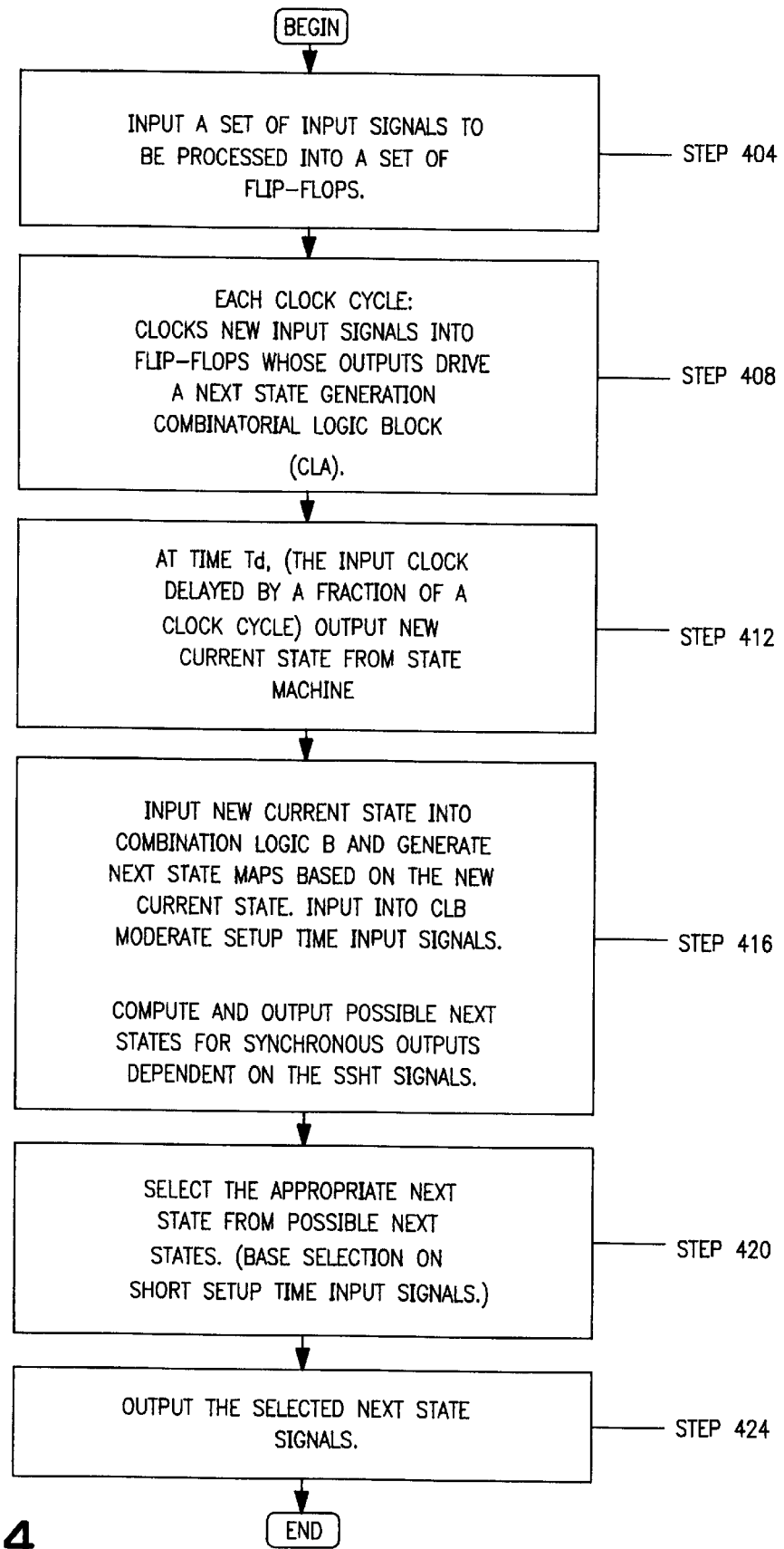
FIG. 4 is a flow diagram of the processes associated with the processing circuit shown in FIG. 3.

FIG. 4 is a flow chart diagram 400 of the operation of an embodiment of the processing circuit. Initially data signals are input into the circuit through flip-flops 312, 314, 316, 318 (step 404) at time t on the rising edge of the clock. Signals captured by the flip-flop are input into the CLA 326 (step 408) element of the state machine 342. CLA 326 processes the signals from the flip-flops along with feedback signals 330 from the SMR 338 (step 408). CLA uses these signals to generate a new current state function. The output generated by the CLA is stored in the state machine register of the state machine at time "$T_{d'}$" where "$T_{d'}$" is the rising edge of the clock signal after being delayed by a delay circuit (Step 412).

At time $T_d$, the state machine transfers the new current state from the state machine to CLB (step 416).

Combination logic in CLB uses the new current state from the state machine as well as moderate setup time input signals to generate mappings of possible output combination (step 416). CLB may compute maps for up to $2^n$ final next state output combinations where n = number of short setup time signals. CLB outputs these various possible next state possibilities. In one embodiment, the output is in the form of an output vector to a selecting circuit.

A selecting circuit, often a multiplexer, takes the possible next state combinations output from the CLB and selects the appropriate next state. (Step 420) The selection is based on SSHT input signals transmitted to the selecting circuit. The appropriate next state signals are clocked into the output flops 374, 376, 378 on the rising edge of the clock (Step 424). The input flops and the output flops are clocked by the same clock 322.

Figure 5:
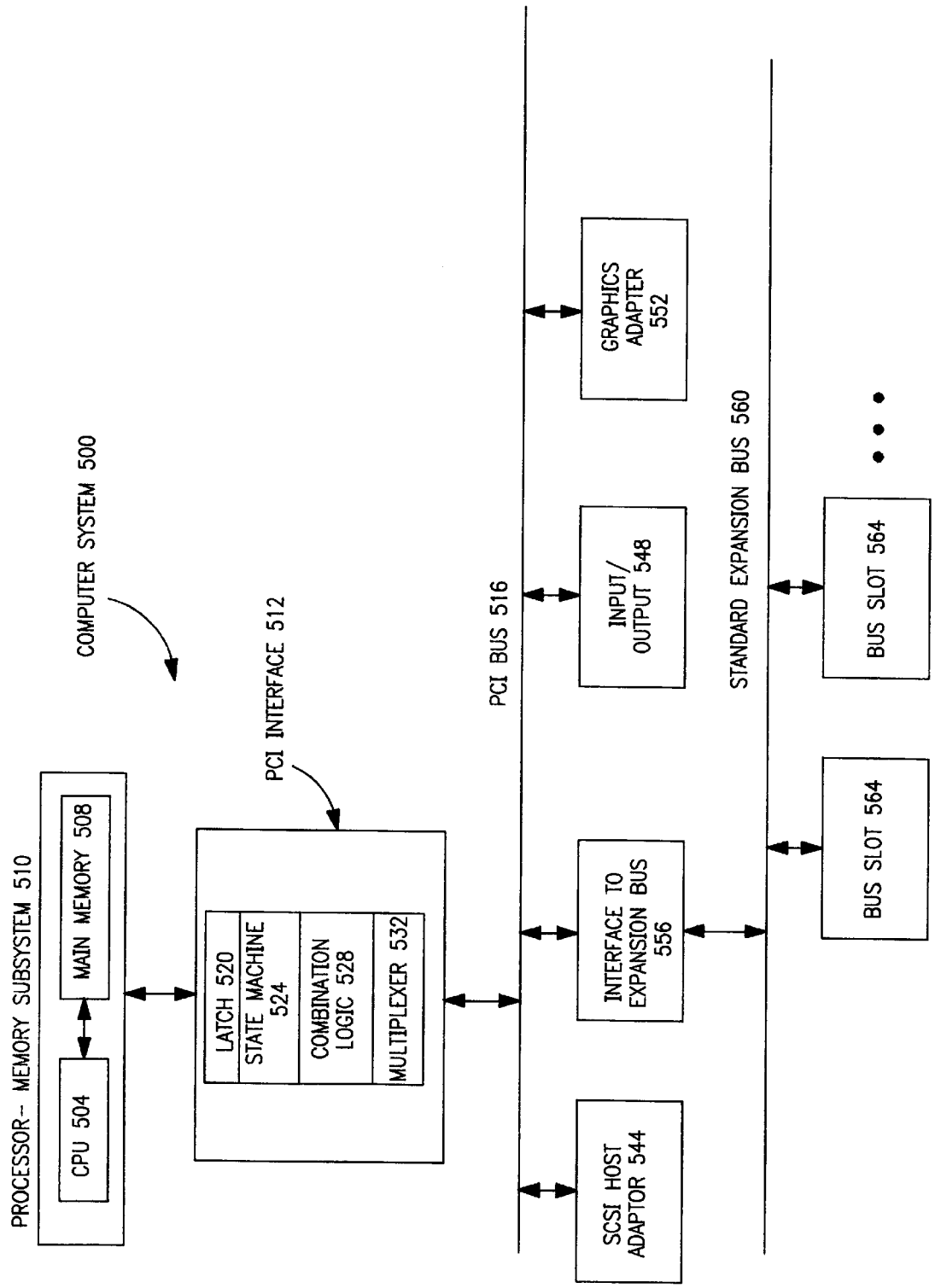
FIG. 5 is a block diagram of a computer system implementing the processing circuit shown in FIG. 3.

FIG. 5 shows the state machine processor circuits implemented in a computer system 500. The computer system 500 includes a central processing unit (CPU) 504 coupled to a memory device 508. The CPU-Memory subsystem 510 provides processed signals to a PCI interface 512. The PCI interface 512 prepares the signals for transmission to a PCI Bus 516.

The PCI interface 512 includes registers 520 which latch incoming signals from the processor memory subsystem 510. A state machine 524 receives the latched signals and generates a new current state. Combination Logic 528 uses the new current states along with MST signals from the CPU-Memory subsystem 510 and the PCI interface 512 itself to generate an output vector which includes possible next states. A multiplexer 532 uses SSHT signals received from the processor memory subsystem 510 to select a particular next state.

At a clock transition, the next state information becomes current state information and the PCI bus 516 transfers the information from the PCI interface 512 to peripherals such as a small computer system interface (SCSI) host adapter 544, an input/output (I/O) terminal 548 and a graphic adapter 552. The information may also be transferred to an interface to an expansion bus 556 where it can be further converted into a format suitable for use on a standard expansion bus 560.

The present invention described herein may be designed in many different methods and using many different configurations. While the present invention has been described in terms of various embodiments, other embodiments may come to mind to those skilled in the art without departing from the spirit and scope of the present invention. The invention should therefore be measured in terms of the claims which follow.

What is claimed:

1. A processing circuit comprising:
    a state machine configured to receive short setup time input signals and to provide a current state at its output;
    a combination logic circuit configured to receive the current state from said state machine output and to provide a plurality of possible next states.

2. The processing circuit of claim 1, further comprising a selecting circuit coupled to said combination logic circuit, said selecting circuit configured to select an appropriate next state.

3. The processing circuit of claim 2, wherein said selecting circuit includes a multiplexer configured to use short setup time input signals to select the appropriate next state.

4. The processing circuit of claim 1, wherein said state machine receives moderate setup time input signals and said short setup time input signals through a plurality of flip-flops.

5. The processing circuit of claim 4 wherein said flip flops are timed by a clock and the output of said state machine is timed by a delay circuit coupled to said clock.

6. A mapping circuit for converting an output from a register and a plurality of short set-up time input signals to a next state signal, said circuit comprising:
    a combination logic circuit that receives the output from the register and generates a plurality of next states;
    a flip-flop circuit to capture the short set-up time input signals; and
    a selector circuit configured to receive said plurality of next states and short set-up time input signals to select and output a single next state.

7. The mapping circuit of claim 6 wherein said combination logic circuit is configured to output a vector including all possible next states.

8. The mapping circuit of claim 6 wherein said combination logic circuit provides all possible next states for different combinations of synchronous short setup time signals.

9. The mapping circuit of claim 6 wherein said selector circuit uses synchronous short setup time signals from a source circuit to select the single next state.

10. A method of processing short setup and hold time input signals, said method comprising the steps of:
    generating a set of new current states from signals received from a source circuit;
    determining several possible next states, for several different short setup and hold time input values based on the new current states,
    selecting a next state from said possible next states based on the short setup and hold time input signals.

11. The method of claim 10 wherein said selecting of said next state is executed by a multiplexer.

12. The method of claim 11 wherein said short setup and hold time inputs have setup times less than 3 nanoseconds.

13. The method of claim 11 wherein an input of said state machine includes a set of flip-flops timed by a clock.

14. The method of claim 13 wherein an output of said state machines is timed by said clock delayed less than one clock cycle.

15. The method of claim 14 wherein an output of a selecting circuit selecting said next state is connected to a second set of flip-flops also timed by said clock.

16. A system which handles short setup time signals, said system comprising:
    a source circuit configured to transmit a plurality of signals, said plurality of signals including at least one short setup time signal;
    a processing circuit configured to receive said plurality of signals, said processing circuit including;
        a first part configured to latch the plurality of signals, a second part configured to receive said latched plurality of signals and generate a current state, a third part configured to receive said current state and provide at least two possible next states, and a fourth part configured to receive said possible next states and select one next state from said possible next states; and
    a destination circuit configured to receive the one next state.

17. The system of claim 16 further comprising:
    a PCI bus for communicating said next state from said source circuit to said destination circuit.

18. The system of claim 16 further comprising a peripheral component interconnect circuit electrically connected between said source circuit and said destination circuit, said peripheral component interconnect including said processing circuit.

19. A processing circuit comprising:
    a state machine configured to receive short hold time input signals and to provide a current state at its output;
    a combination logic circuit configured to receive the current state from said state machine output and to provide a plurality of possible next states.

20. The processing circuit of claim 19, further comprising a selecting circuit coupled to said second combination logic circuit, said selecting circuit configured to select an appropriate next state.

21. A computer system comprising:

a central processing unit configured to provide processed output signals;

an interface coupled to said central processing unit, said interface including a processing unit which is comprised of a first part configured to latch the output signals from said central processing unit, a second part configured to receive said latched output signals and generate a current state, a third part configured to receive said current state and provide at least two possible next states, and a fourth part configured to receive said possible next states and select one next state from said possible next states;

a bus configured to receive and communicate the one next state from said interface, a peripheral device configured to receive and use the one next state from said bus.

22. A processing circuit comprising:

a state machine configured to receive input signals having set-up time durations as short as the sum of a flip-flop set-up time added to one gate delay, said state machine configured to provide a current state at its output; and a combination logic circuit configured to receive the current state from said state machine output and to provide a plurality of possible next states.

* * * * *